United States Patent
Wang et al.

(10) Patent No.: US 7,432,692 B2
(45) Date of Patent: Oct. 7, 2008

(54) CIRCUIT AND METHOD FOR CHANGING TRANSIENT RESPONSE CHARACTERISTICS OF A DC/DC CONVERTER MODULE

(75) Inventors: Thomas G. Wang, Fremont, CA (US); Vijayan J. Thottuvelil, Addison, TX (US); Cahit Gezgin, Murphy, TX (US)

(73) Assignee: Lineage Power Corporation, Mesquite, TX (US)

( * ) Notice: Subject to any disclaimer, the term of this patent is extended or adjusted under 35 U.S.C. 154(b) by 34 days.

(21) Appl. No.: 11/558,004

(22) Filed: Nov. 9, 2006
(Under 37 CFR 1.47)

(65) Prior Publication Data

US 2007/0182252 A1    Aug. 9, 2007

Related U.S. Application Data

(60) Provisional application No. 60/764,708, filed on Feb. 2, 2006.

(51) Int. Cl.
G05F 1/59     (2006.01)
H02H 3/22    (2006.01)

(52) U.S. Cl. .......................... 323/268; 323/350; 363/65; 361/111

(58) Field of Classification Search .................. 361/111; 363/65; 323/267, 268, 318, 349, 350, 351, 323/225; 307/11, 12, 18, 19, 58, 82
See application file for complete search history.

(56) References Cited

U.S. PATENT DOCUMENTS

| | | | |
|---|---|---|---|
| 5,894,412 A * | 4/1999 | Faulk | ........................... 363/17 |
| 6,201,723 B1 | 3/2001 | Farrington | |
| 6,774,612 B1 * | 8/2004 | Ballenger et al. | ........... 323/303 |
| 7,224,153 B2 * | 5/2007 | DeVries et al. | ............. 323/284 |
| 2004/0217749 A1 | 11/2004 | Orr et al. | |

FOREIGN PATENT DOCUMENTS

WO     2004/082112    9/2004

* cited by examiner

Primary Examiner—Gary L Laxton (57) ABSTRACT

A circuit for, and method of, changing transient response characteristics of a DC/DC converter module having an output rail pin and a trim pin and a distributed power conversion system incorporating the system or the method. In one embodiment, the system includes a reactive component coupled to the output rail pin and the trim pin of the DC/DC converter module and configured to interact with at least one network internal to the DC/DC converter module to change the transient response characteristics.

21 Claims, 6 Drawing Sheets

CIRCUIT AND METHOD FOR CHANGING TRANSIENT RESPONSE CHARACTERISTICS OF A DC/DC CONVERTER MODULE

CROSS-REFERENCE TO PROVISIONAL APPLICATION

This application claims the benefit of U.S. Provisional Application No. 60/764708 entitled "How to Improve DC/DC Module Transient Responses," filed by Thomas Wang, et al., on Feb. 2, 2006, and incorporated herein by reference.

TECHNICAL FIELD OF THE INVENTION

The invention is directed, in general, to DC/DC power conversion and, more particularly, to a circuit and method for changing the transient response characteristics of a DC/DC power converter, which may take the form of a "point-of-load" (POL) converter module.

BACKGROUND OF THE INVENTION

Sophisticated power conversion systems continue to play a vital role supporting modern electronic systems of all manner and types. Some electronic systems contain multiple loads, each having its own particular demands in terms of current, voltage and quality. Accordingly, distributed power conversion systems have come into use to provide power to those electronic systems.

Distributed power conversion systems are characterized by a central converter and a DC power distribution bus coupled to the output of the central converter. Coupled to the DC power distribution bus and corresponding to various loads in the electronic system are a plurality of DC/DC converters, which may take the form of POL converters. (DC/DC converters may be isolated or non-isolated; POL converters are usually only non-isolated.) The DC/DC converters are designed to perform a final conversion of power from the DC power distribution bus to the particular loads with which they are associated.

DC/DC converters are commercially available in the form of standard and prepackaged modules having predefined input and output pins and an output voltage set, or "trim," pin. The modules contain a power train and a control circuit that determines not only the output voltage, but the manner in which the power train responds to transient conditions that may occur as a result of fluctuations in either the power bus or load (often called the "transient response characteristics" of the module). Because the modules are standard and prepackaged, their control circuits are by necessity designed to have transient response characteristics suitable for accommodating a wide array of possible loads.

Unfortunately, transient response characteristics that may be acceptable for a variety of loads is frequently suboptimal for a particular load. As a consequence, the quality of the power and overall effectiveness of the system often suffer. Of course, one could design and deploy a custom DC/DC converter that is not a standard product but instead custom designed to a particular load with matched transient response characteristics, but that is a manifestly more expensive solution and therefore unacceptable for many cost-sensitive applications.

What is needed in the art is a way to adapt to a particular load the transient response characteristics of a commercially-available DC/DC converter module. More specifically, what is needed in the art is a way to change the transient response characteristics of a commercially-available standard DC/DC converter module without breaching the module, but instead keeping its package and external interface intact.

SUMMARY OF THE INVENTION

To address the above-discussed deficiencies of the prior art, the invention provides, in one aspect, a circuit for changing transient response characteristics of a DC/DC converter module having an output rail pin and a trim pin. In one embodiment, the system includes a reactive component coupled to the output rail pin and the trim pin of the DC/DC converter module and configured to interact with at least one network internal to the DC/DC converter module to change the transient response characteristics.

In another aspect, the invention provides a method of changing transient response characteristics of a DC/DC converter module having an output rail pin and a trim pin. In one embodiment, the method includes: (1) coupling a reactive component to the output rail pin and the trim pin of the DC/DC converter module and (2) causing the reactive component to interact with at least one network internal to the DC/DC converter module to change the transient response characteristics.

In yet another aspect, the invention provides a distributed power conversion system. In one embodiment, the system includes: (1) a central converter, (2) a DC power distribution bus coupled to an output of the central converter and (3) a plurality of DC/DC converter modules coupled to the DC power distribution bus, each of the plurality of DC/DC converter modules having an output rail pin, a trim pin and a circuit for changing transient response characteristics of the each of the POL converter modules, the circuit including a reactive component coupled to the output rail pin and the trim pin of the each of the POL converter modules and configured to interact with at least one network internal to the each of the POL converter modules to change the transient response characteristics.

The foregoing has outlined preferred and alternative features of the invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the invention. Those skilled in the pertinent art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
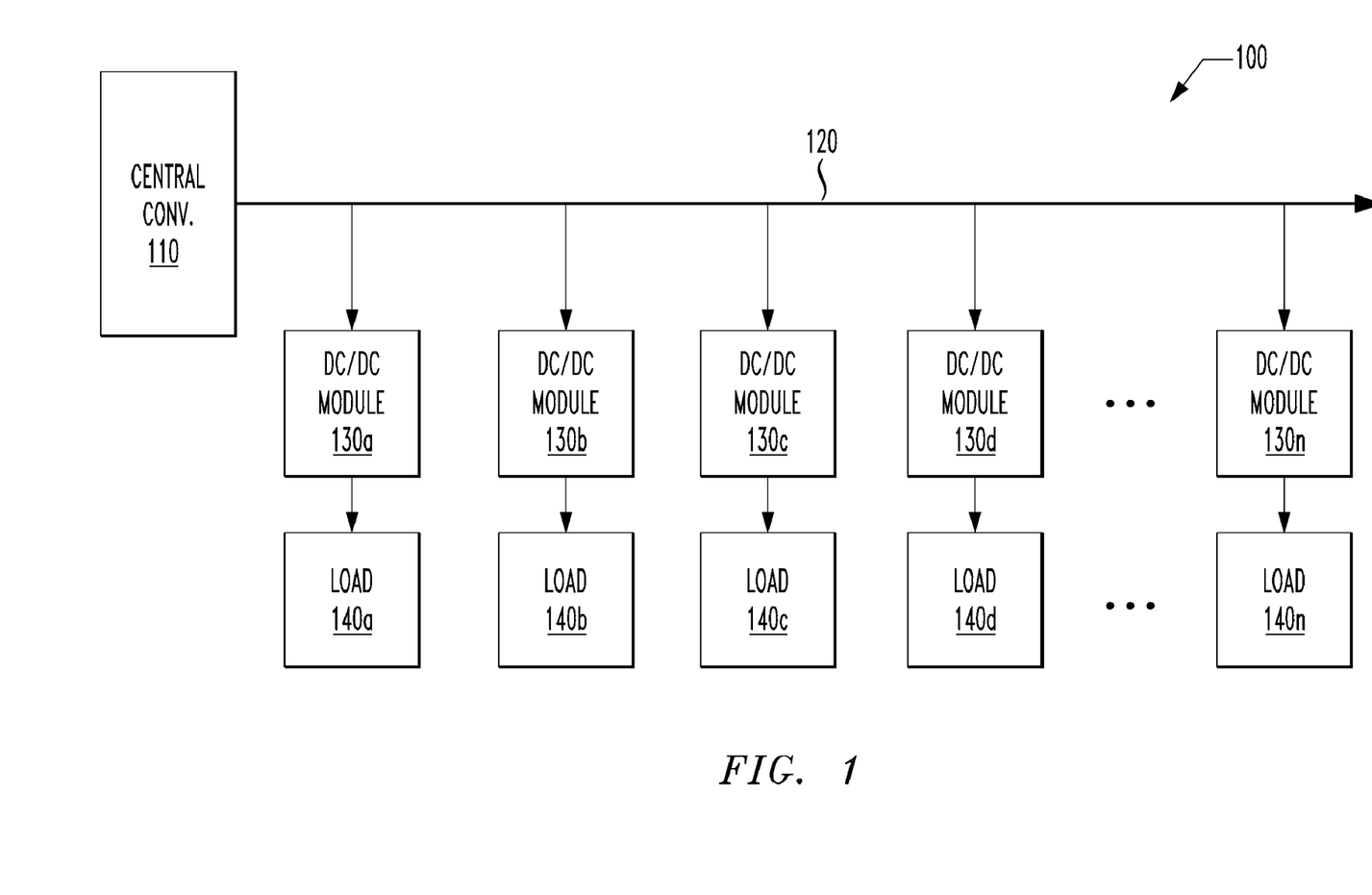
FIG. 1 illustrates a block diagram of a distributed power conversion system containing a central converter and a distributed plurality of DC/DC converter modules for corresponding loads and incorporating the system or method of the invention.

Referring initially to FIG. 1, illustrated is a block diagram of a distributed power conversion system, generally designated 100, that incorporates the system or method of the invention. The distributed power conversion system 100 contains a central converter 110 and a DC power distribution bus 120 coupled to the output of the central converter 110. Coupled to the DC power distribution bus 120 and corresponding to various loads, e.g., 140a, 140b, 140c, 140d, 140n are a plurality of DC/DC converter modules, e.g., 130a, 130b, 130c, 130d, 130n. The DC/DC convertermodules 130a, 130b, 130c, 130d, 130n are designed to perform a final conversion of power from the DC power distribution bus 120 to the particular loads 140a, 140b, 140c, 140d, 140n with which they are associated. The DC/DC converter modules 130a, 130b, 130c, 130d, 130n may contain isolated or non-isolated converters. They may contain POL converters, which are usually only non-isolated.

Figure 2:
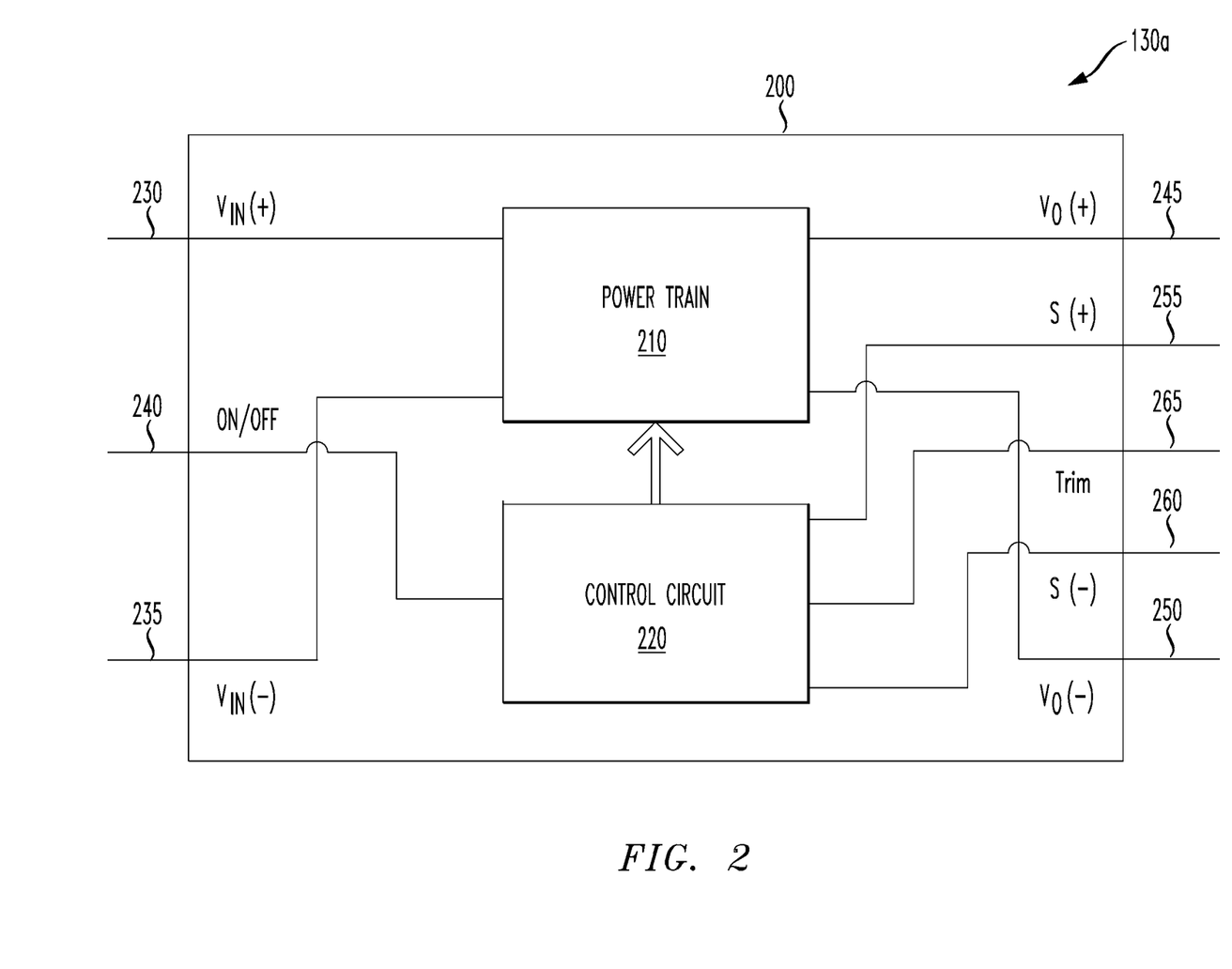
FIG. 2 illustrates a block and pinout diagram of a commercially available, standard DC-DC converter module to which a circuit or method constructed or carried out according to the principles of the invention may be applied to change its transient response characteristics.

As stated above, the control circuit 220 determines not only the output voltage of the DC/DC converter module 130a, but the transient response characteristics of the power train 210 to fluctuations in either the power bus (e.g., the DC power distribution bus 120 of FIG. 1) or the load (e.g., the load 140a of FIG. 1). The DC/DC converter module 130a of FIG. 2 is often commercially available in the form of a standard prepackaged module (represented by a surrounding, solidline box 200). Because the DC/DC converter module 130a is prepackaged, its control circuit 220 is by necessity designed to have transient response characteristics suitable for accommodating a wide array of possible loads.

The DC/DC converter module 130a contains a power train 210 that is responsible for performing power conversion in response to control signals provided by a control circuit 220. Those skilled in the pertinent art are familiar with the many conventional power train topologies for power converters. The invention may incorporate any conventional or later-developed power train topology.

As stated above, the control circuit 220 determines not only the output voltage of the DC/DC converter module 130a, but the transient response characteristics of the power train 210 to fluctuations in either the power bus (e.g., the DC power distribution bus 120 of FIG. 1) or the load (e.g., the load 135a of FIG. 1). The DC/DC converter module 130a of FIG. 2 is often commercially available in the form of a standard prepackaged module (represented by a surrounding, solid-line box 200). Because the DC/DC converter module 130a is prepackaged, its control circuit 220 is by necessity designed to have transient response characteristics suitable for accommodating a wide array of possible loads.

The DC/DC converter module 130a has predefined pins ("pins" being a generic term for a package electrical contact of any physical configuration). More specifically, the DC/DC converter module 130a has a Vin(+) pin 230, which is a positive input rail; a Vin(−) pin 235, which is a negative input rail; an On/Off pin 240, which receives a control signal to turn the DC/DC converter module 130a on and off; a Vo(+) pin 245, which is a positive output rail; a Vo(−) pin 250, which is a negative output rail; an S(+) pin 255, which is a positive remote sense pin and designed to be connected to a point on the positive rail where a voltage control point is to be established; an S(−) pin 260, which is a negative remote sense pin and designed to be connected to a point on the negative rail where a voltage control point is to be established; and a Trim pin 265 which is designed to be connected to one or both of a resistor and a voltage source to adjust the output voltage level of the DC/DC converter module 130a (i.e., as between the Vo(+) pin 245 and the Vo(−) pin 250).

In some commercially-available modules, Vo(+) and S(+) are connected together inside the module, and Vo(−) and S(−) are likewise connected together inside the module. Connecting Vo(+) and S(+) and Vo(−) and S(−) reduces pin count by two, but at the cost of forcing voltage regulation to occur at a point within the module. For the sake of simplicity, FIGS. 3, 4 and 5 happen to show Vo(+) and S(+) and Vo(−) and S(−) to be connected together inside the module. However, the principles of the invention apply irrespective of whether or not Vo(+) and S(+) and Vo(−) and S(−) are connected together, either inside or outside the module. In non-isolated DC-DC converter modules, a common ground terminal often replaces the Vin(−) and Vo(−) terminals and serves the functions of both of these terminals.

Figure 3:
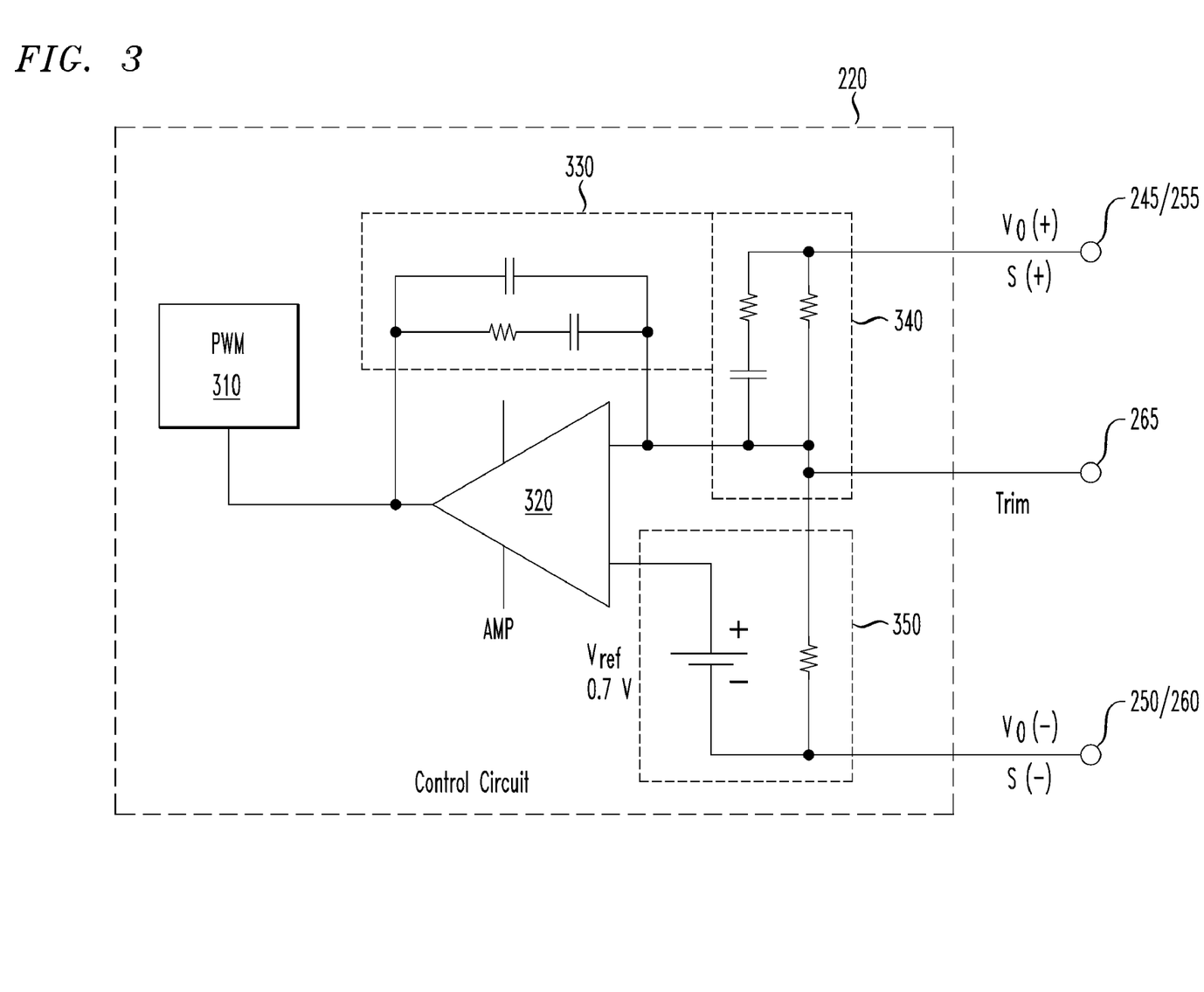
FIG. 3 illustrates a schematic diagram of a control circuit contained within the commercially available DC/DC converter module of FIG. 2.

Turning now to FIG. 3, illustrated is a schematic diagram of the control circuit 220 contained within the commercially available DC/DC converter module 130a of FIG. 2. The control circuit 220 contains a pulse-width modulator 310 that provides a pulse-width modulated (PWM) control signal that is a function of the output of an operational amplifier (opamp) 320. A feedback network 330 and first and second input networks 340, 350 contain reactive components (e.g., capacitors) and other components (e.g., resistors) that determine the manner in which the opamp 320 responds to transient conditions in Vo(+)/S(+) 245/255 and Vo(−)/S(−) 250/260. The transient response characteristics of the control circuit 220 and the DC/DC converter module (e.g., 130a) of FIGS. 1 and 2 as a whole therefore depend upon the values of the components in the feedback network 330 and the first and second input networks 340, 350. As described above, these components are internal to the module and not accessible without breaching and probably damaging the module. As can be seen in FIG. 3, the Trim pin 265 is available to set the output voltage of the module by coupling one or more resistors or voltage sources to the Trim pin and, usually, Vo(−) or Vo(+). However, the Trim pin 265 has heretofore been strictly limited to that purpose.

The invention involves a fundamental recognition: that the Trim pin 265 can be used for a new, nonobvious and utterly unexpected purpose. Instead of regarding the trim pin as merely a means for changing the output voltage of the module (through the use of one or more resistors or voltage sources), the trim pin can instead or additionally be used to change the transient response characteristics of the module (through the use of one or more reactive components). This allows the transient response characteristics of the module to be tailored to a particular load, if so desired.

By coupling one or more reactive components (e.g., a capacitor) to the Trim pin 265, the first or second input networks 340, 350, or both, can be augmented and thereby changed. Changing one or both of the first and second input networks 340, 350 changes the manner in which the opamp 320 responds to transient conditions in Vo(+)/S(+) 245/255 and Vo(−)/S(−) 250/260 and therefore changes the transient response characteristics of the control circuit 220 and the DC/DC converter module (e.g., 130a) of FIGS. 1 and 2 as a whole.

Figure 4:
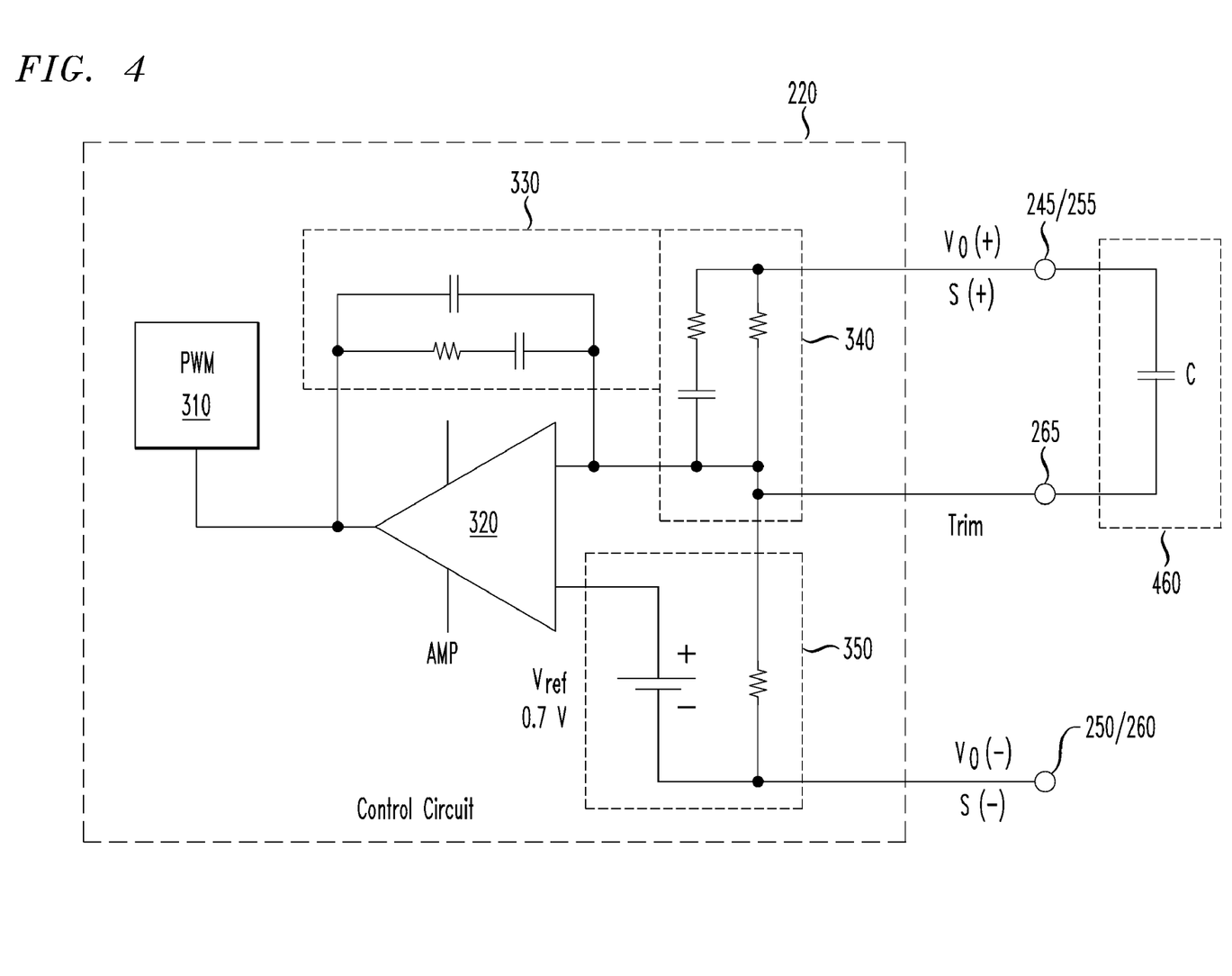
FIG. 4 illustrates the control circuit of FIG. 3 along with a schematic diagram of one embodiment of a circuit for changing the transient response characteristics of a DC/DC converter module constructed according to the principles of the invention.

Turning now to FIG. 4, illustrated is the control circuit 220 of FIG. 3 along with a schematic diagram of one embodiment of a circuit 460 for changing the transient response characteristics of a DC/DC converter module constructed according to the principles of the invention. In FIG. 4, the circuit 460 takes the form of a single reactive component spanning the Vo(+)/S(+) pin 245/255 and the Trim pin 265. The single reactive component is shown specifically to be a capacitor. Alternatively, the circuit 460 may take the form of multiple reactive components, may consist of or include one or more reactive components that are not capacitors (e.g., inductors), may span the Trim pin 265 and the Vo(−)/S(−) pin 250/260, or may span the Vo(+)/S(+) pin 245/255 and the Trim pin 265. The circuit 460 interacts with the first input network 340 to change the transient response characteristics of the module.

Figure 5:
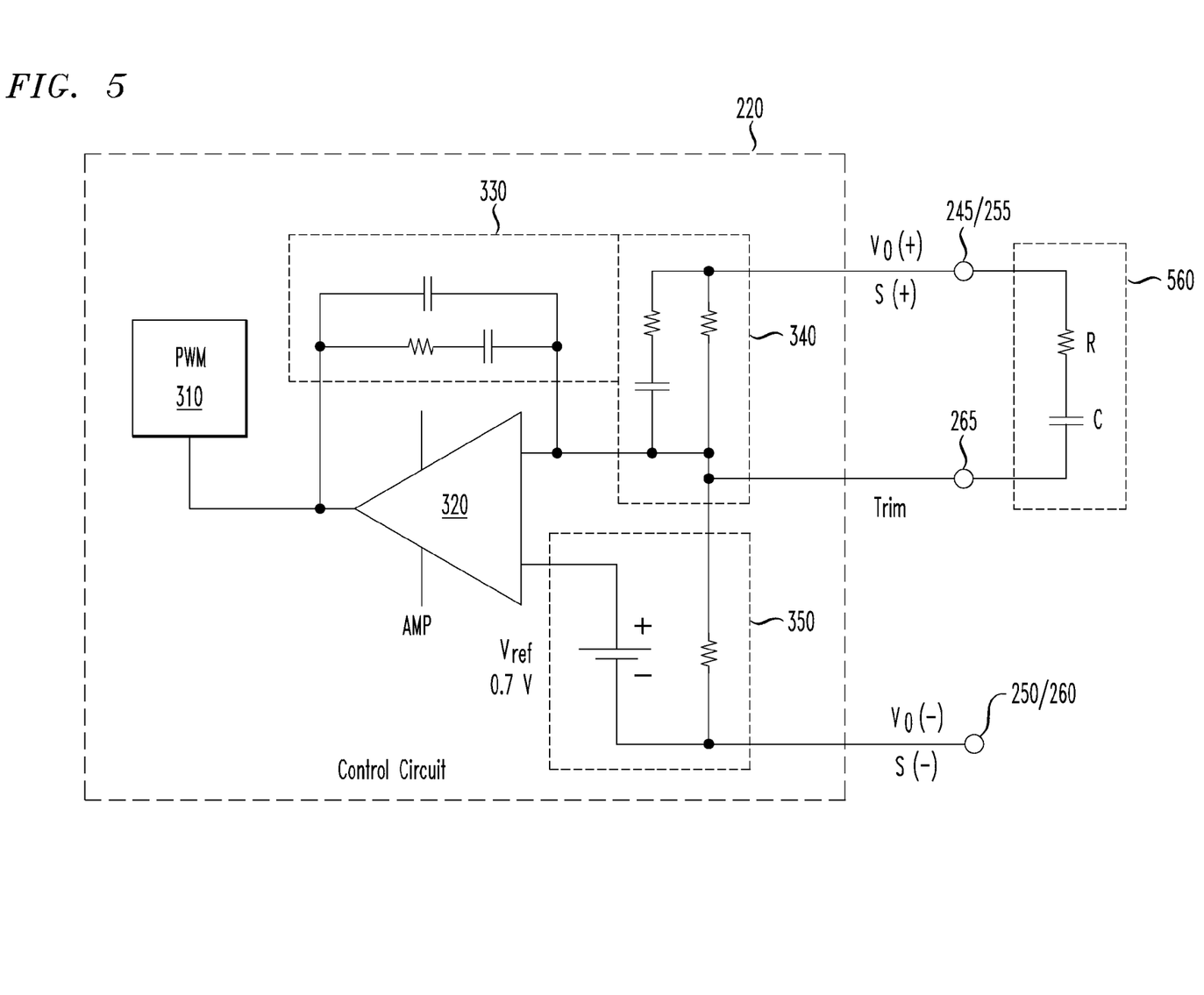
FIG. 5 illustrates the control circuit of FIG. 3 along with a schematic diagram of another embodiment of a circuit for changing the transient response characteristics of a DC/DC converter module constructed according to the principles of the invention.

Turning now to FIG. 5, illustrated is the control circuit 220 of FIG. 3 along with a schematic diagram of another embodiment of a circuit 560 for changing the transient response characteristics of a DC/DC converter module constructed according to the principles of the invention. In FIG. 5, the circuit 560 takes the form of a single reactive component coupled in series with a single nonreactive component spanning the Vo(+)/S(+) pin 245/255 and the Trim pin 265. The single reactive component is shown specifically to be a capacitor. The single nonreactive component is shown to be a resistor. Alternatively, the circuit 560 may take the form of multiple reactive and/or nonreactive components, may consist of or include one or more reactive components that are not capacitors (e.g., inductors), may span the Trim pin 265 and the Vo(−)/S(−) pin 250/260, or may span the Vo(+)/S(+) pin 245/255 and the Trim pin 265. As with FIG. 4, the circuit 560 interacts with the first input network 340 to change the transient response characteristics of the module.

For example, a module may have a transient output voltage deviation of 216 mV given a change in load from 3A to 6A. Applying a 47 µF external capacitance to the load (as would be conventional), the transient output voltage deviation drops only to 141 mV. However, applying a series-connected 10 nF capacitor and 47Ω resistor across Vo(+) and Trim pins, the transient output voltage deviation is dramatically reduced to 62 mV. In fact, it has been found that other values of capacitance and resistance can yield more than a five-fold improvement in transient response.

Figure 6:
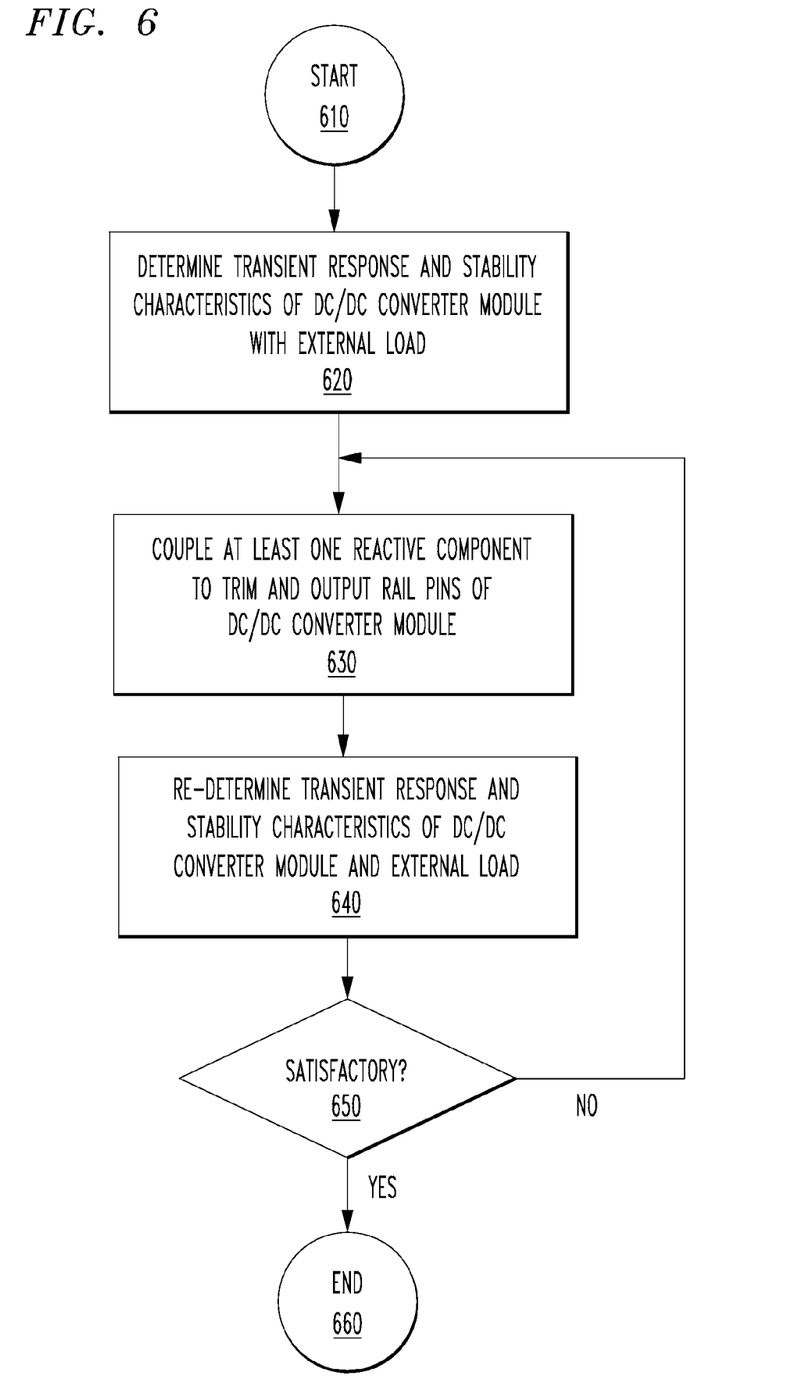
FIG. 6 illustrates a flow diagram of one embodiment of a method of changing the transient response characteristics of a DC/DC converter module carried out according to the principles of the invention.

Turning now to FIG. 6, illustrated is a flow diagram of one embodiment of a method of changing the transient response characteristics of a DC/DC converter module carried out according to the principles of the invention. The method begins in a start step 610. In a step 620, the transient response and stability characteristics of the module with the external load are determined. This establishes a base performance condition for the module and load for which improvement is sought. In a step 630, an external network containing at least one reactive component (e.g., a capacitor) is coupled to the output rail pin and the trim pin of a DC/DC converter module. Alternatively, the reactive component may be replaced with another reactive component or augmented with an additional reactive component or a nonreactive component. In one advantageous embodiment, this external network takes the form of a capacitor in series with a resistor as shown in FIG. 5. In a step 640, the transient response and stability characteristics of the module and load, along with the external network connected between the output rail and trim pin, are re-determined. If satisfactory (determined in a decisional step 650), the method ends in a step 660. However, if desired, the steps 630, 640 can be reiterated until a satisfactory set of component values for the network connected externally between the output rail and trim pins is obtained. Alternatively, the overall external load may be altered by modifying the load filtering network connected across the load and then re-determining the optimal values of the external network connected between the output rail and trim pins of the DC/DC converter.

Although the invention has been described in detail, those skilled in the pertinent art should understand that they can make various changes, substitutions and alterations herein without departing from the spirit and scope of the invention in its broadest form.

What is claimed is:

1. A circuit for changing transient response characteristics of a DC/DC converter module having an output rail pin and a trim pin, wherein a steady state output voltage of said module is set at said trim pin, comprising:
   a reactive component coupled to said output rail pin and said trim pin of said DC/DC converter module and configured to interact with at least one network internal to said DC/DC converter module to change said transient response characteristics.

2. The circuit as recited in claim 1 wherein said reactive component is a capacitor.

3. The circuit as recited in claim 1 further comprising a nonreactive component coupled to said reactive component.

4. The circuit as recited in claim 3 wherein said nonreactive component is coupled in series with said reactive component.

5. The circuit as recited in claim 1 wherein said output rail pin is a positive output rail pin.

6. The circuit as recited in claim 1 wherein said output rail pin is coupled to a sense pin of said DC/DC converter module.

7. The circuit as recited in claim 1 wherein said DC/DC converter module is a POL converter module.

8. A method of changing transient response characteristics of a DC/DC converter module having an output rail pin and a trim pin, wherein a steady state output voltage of said module is set at said trim pin, comprising:
   coupling a reactive component to said output rail pin and said trim pin of said DC/DC converter module; and
   causing said reactive component to interact with at least one network internal to said DC/DC converter module to change said transient response characteristics.

9. The method as recited in claim 8 wherein said reactive component is a capacitor.

10. The method as recited in claim 8 further comprising coupling a nonreactive component to said reactive component.

11. The method as recited in claim 10 wherein said coupling said nonreactive component comprises coupling said nonreactive component in series with said reactive component.

12. The method as recited in claim 8 wherein said output rail pin is a positive output rail pin.

13. The method as recited in claim 8 wherein said output rail pin is coupled to a sense pin of said DC/DC converter module.

14. The method as recited in claim 8 wherein said DC/DC converter module is a POL converter module.

15. A distributed power conversion system, comprising:
a central converter;
a DC power distribution bus coupled to an output of said central converter; and
a plurality of DC/DC converter modules coupled to said DC power distribution bus, each of said plurality of DC/DC converter modules having an output rail pin, a trim pin and a circuit for changing transient response characteristics of said each of said DC/DC converter modules, wherein a steady state output voltage of each of said modules is set at said trim pin, said circuit including:
a reactive component coupled to said output rail pin and said trim pin of said each of said DC/DC converter modules and configured to interact with at least one network internal to said each of said DC/DC converter modules to change said transient response characteristics.

16. The system as recited in claim 15 wherein said reactive component is a capacitor.

17. The system as recited in claim 15 further comprising a nonreactive component coupled to said reactive component.

18. The system as recited in claim 17 wherein said nonreactive component is coupled in series with said reactive component.

19. The system as recited in claim 15 wherein said output rail pin is a positive output rail pin.

20. The system as recited in claim 15 wherein said output rail pin is coupled to a sense pin of said each of said DC/DC converter modules.

21. The system as recited in claim 15 wherein said each of said DC/DC converter modules is a POL converter module.

* * * * *

UNITED STATES PATENT AND TRADEMARK OFFICE
CERTIFICATE OF CORRECTION

PATENT NO. : 7,432,692 B2
APPLICATION NO. : 11/558004
DATED : October 7, 2008
INVENTOR(S) : Wang et al.

It is certified that error appears in the above-identified patent and that said Letters Patent is hereby corrected as shown below:

Column 3, lines 39 - 51, delete and replace as follows:

Turning now to FIGURE 2, illustrated is a block and pinout diagram of a commercially available DC/DC converter module, e.g., the DC/DC converter module 130a of FIGURE 1, to which a circuit or method constructed or carried out according to the principles of the invention may be applied to change its transient response characteristics.

Column 3, lines 59 - 67 and Column 4, lines 1 - 3, delete and replace as follows:

As stated above, the control circuit 220 determines not only the output voltage of the DC/DC converter module 130a, but the transient response characteristics of the power train 210 to fluctuations in either the power bus (e.g., the DC power distribution bus 120 of FIGURE 1) or the load (e.g., the load 140a of FIGURE 1). The DC/DC converter module 130a of FIGURE 2 is often commercially available in the form of a standard prepackaged module (represented by a surrounding, solid-line box 200). Because the DC/DC converter module 130a is prepackaged, its control circuit 220 is by necessity designed to have transient response characteristics suitable for accommodating a wide array of possible loads.

Signed and Sealed this

Sixteenth Day of March, 2010

David J. Kappos
*Director of the United States Patent and Trademark Office*